(12) United States Patent
Kuwa et al.

(10) Patent No.: US 8,045,279 B2
(45) Date of Patent: Oct. 25, 2011

(54) MOLDED LENS AND MOLDING TOOL

(75) Inventors: Tadahiro Kuwa, Ibaraki (JP); Hideki Komiya, Ibaraki (JP); Masashi Yoshimura, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 518 days.

(21) Appl. No.: 12/071,560

(22) Filed: Feb. 22, 2008

(65) Prior Publication Data
US 2008/0212198 A1   Sep. 4, 2008

(30) Foreign Application Priority Data

Mar. 2, 2007   (JP) ................... 2007-053262

(51) Int. Cl.
G02B 13/18     (2006.01)
G02B 7/02      (2006.01)
G02B 3/00      (2006.01)
(52) U.S. Cl. ........ 359/719; 359/741; 359/810; 359/812; 359/818; 359/819; 264/1.32; 264/1.36; 264/1.38; 369/112.23; 425/808
(58) Field of Classification Search .............. 359/642, 359/719, 741, 810–812, 818, 819; 264/1.32, 264/1.36, 1.38; 369/112.23; 425/808
See application file for complete search history.

(56) References Cited

U.S. PATENT DOCUMENTS
5,805,361 A * 9/1998 Morimoto et al. ............ 359/819

FOREIGN PATENT DOCUMENTS
JP    A 2002-122711    4/2002

OTHER PUBLICATIONS

Oct. 27, 2009 Decision to Grant a Patent issued in corresponding Japanese Application No. 2007-053262 (with translation).
Aug. 4, 2009 Notice of Reason for Rejection issued in corresponding Japanese Application No. 2007-053262 (with partial translation).

* cited by examiner

*Primary Examiner* — Evelyn A. Lester
(74) *Attorney, Agent, or Firm* — Oliff & Berridge, PLC

(57) ABSTRACT

A lens is manufactured by hardening soft material filled inside a molding tool by cooling. The lens includes a convex lens portion having an optical axis, and a marking portion located outside of an effective diameter of the lens portion. The shape or the position of the marking portion is set to prevent deformation of the marking portion by contact with the molding tool due to shrinkage of the material during cooling.

12 Claims, 14 Drawing Sheets

MOLDED LENS AND MOLDING TOOL

BACKGROUND OF THE INVENTION

1. Field of the Invention

The present invention relates to a molded lens and a molding tool.

2. Description of Related Art

Optical disc apparatus for performing recording and playback of various information on optical recording media such as CD and DVD have been widely used. An optical disc apparatus includes an optical pickup device for reading information recorded on an optical recording medium. An optical pickup device includes a pickup lens for focusing light from a light source on an optical recording medium.

A pickup lens is generally composed of a convex lens. A pickup lens may be fabricated by molding glass material. A glass pickup lens may be fabricated by injection molding or transfer molding with use of a molding die. For example, the injection molding process supplies glass material into a cavity in a molding die and heats to soften the glass material. It then cools the glass material, thereby producing a pickup lens.

Pickup lenses are produced in large quantities in order to reduce a unit price. A plurality of pickup lenses are manufactured at a time with use of a molding die having a plurality of cavities. For example, a molding die having eight cavities may be used for manufacturing eight pickup lenses at a time. In such a case, it is desired to manufacture pickup lenses having the same quality in each cavity. However, in actuality, manufacturing quality can vary from cavity to cavity. Further, manufacturing quality can also vary from molding die to molding die. In light of this, a technique of providing a marking on a lens is disclosed in Japanese Unexamined Patent Application Publication No. 2002-122711, for example.

A method of manufacturing a glass lens on which a marking is made is described hereinafter with reference to FIGS. 13 and 14. FIG. 13 is a side view showing a manufacturing method of a glass lens 4 on which a marking is made. FIG. 14 is an enlarged side view of a marking portion 3 on the glass lens 4. In this example, the glass lens 4 which has the marking portion 3 that is integrally formed on the top surface of a flange portion 2 is described by way of illustration.

Firstly, glass material is supplied to a cavity in a molding die 10. Then, the glass material and the molding die 10 are heated to soften the glass material. The molding die 10 has a shape that corresponds to a shape of a molded item (the glass lens 4). In this example, a concave portion is formed in a part of an upper mold 10a of the molding die 10 which corresponds to the marking portion 3 as shown in FIG. 13. After that, pressure is applied to the glass material by the upper mold 10a and a lower mold 10b of the molding die 10, and the glass material is then cooled. The glass lens 4 which has the marking portion 3 in a shape that protrudes from the top surface of the flange portion 2 is thereby formed.

However, if the marking portion 3 is formed by the above method, the marking portion 3 and the concave portion of the upper mold 10a come into contact to cause chipping of the marking portion 3. This is because the degree of shrinkage during cooling of the glass material is larger than that of the molding die 10 and, consequently, the glass material shrinks toward the center more significantly than the molding die 10 does. In other words, due to a large difference in the coefficient of thermal expansion between the glass material and the molding die 10, the marking portion 3 can get chipped by contact with the upper mold 10a. If the marking portion 3 of the glass lens 4 and the concave portion of the upper mold 10a of the molding die 10 come into contact as shown in FIG. 14, the marking portion 3 can get chipped. The above drawback can occur in a molded lens which uses lens material having a larger coefficient of thermal expansion than a molding die. Specifically, the above drawback can occur not only in the glass lens 4 but also in a plastic molded lens.

Besides the above method, as other methods of forming a marking portion on the glass lens 4, there are techniques of performing processing afterward, such as writing a marking by a marker pen, changing a deposition mask shape, and performing additional processing. However, those methods require additional work because they cause a trace (marking) error, need cleaning, and so on. In the method using a marker pen, there is the possibility that a marking disappears.

SUMMARY OF THE INVENTION

In view of the foregoing, it is an object of the present invention to provide a molded lens and a molding tool that allows easy formation of a marking portion.

According to an embodiment of the present invention, there is provided a lens manufactured by hardening soft material filled inside a molding tool by cooling, which includes a convex lens portion having an optical axis, and a marking portion located outside of an effective diameter of the lens portion, wherein a shape or a position of the marking portion is set to prevent deformation of the marking portion by contact with the molding tool due to shrinkage of the material during cooling. This prevents the chipping of the marking portion by contact with a molding die during cooling in the manufacturing process.

Preferably, the marking portion is a projecting portion with one end coupled to the lens portion and having a height in the optical axis direction decreasing as being away from the optical axis.

Also preferably, the marking portion is a projecting portion with one end coupled to the lens portion and with a constant height in the optical axis direction as being away from the optical axis.

It is preferred that the lens further includes a flange portion located on a periphery of the lens portion, and the marking portion is a depressed portion on the flange portion with one end coupled to an edge of the flange portion and with a depth decreasing as extending from the edge of the flange portion toward the optical axis of the lens portion.

It is also preferred that the lens further includes a flange portion located on a periphery of the lens portion and having an inclined portion getting higher in the optical axis direction from the outer edge of the flange portion toward the optical axis, and the marking portion is located in the inclined portion of the flange portion.

According to another embodiment of the present invention, there is provided a molding tool used when molding a lens by hardening soft material filled inside by cooling, which includes a first part for molding a convex lens portion having an optical axis, and a second part for molding a marking portion located outside of an effective diameter of the lens portion, wherein a shape or a position of the second part is set to prevent deformation of the marking portion by contact with the molding tool due to shrinkage of the material during cooling.

According to another embodiment of the present invention, there is provided a molded lens which includes a lens portion including a convex first optical functional portion, and a marking portion located outside of an effective diameter of the first optical functional portion and extending away from an optical axis, wherein when viewing cross sections of a part of the molded lens having the marking portion along a first plane being parallel with the optical axis, away from the optical axis by a first distance in the radial direction having a cross-sectional plane of the marking portion at a position and along a second plane being parallel with the first plane and away from the optical axis by a second distance different from the first distance in the radial direction, a cross-sectional shape of the molded lens along the first plane includes a cross-sectional shape of the molded lens along the second plane. This prevents the chipping of the marking portion by contact with a molding die during cooling in the manufacturing process.

The present invention provides a molded lens and a molding tool that allows easy formation of a marking portion.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

First Embodiment

Figure 1A:
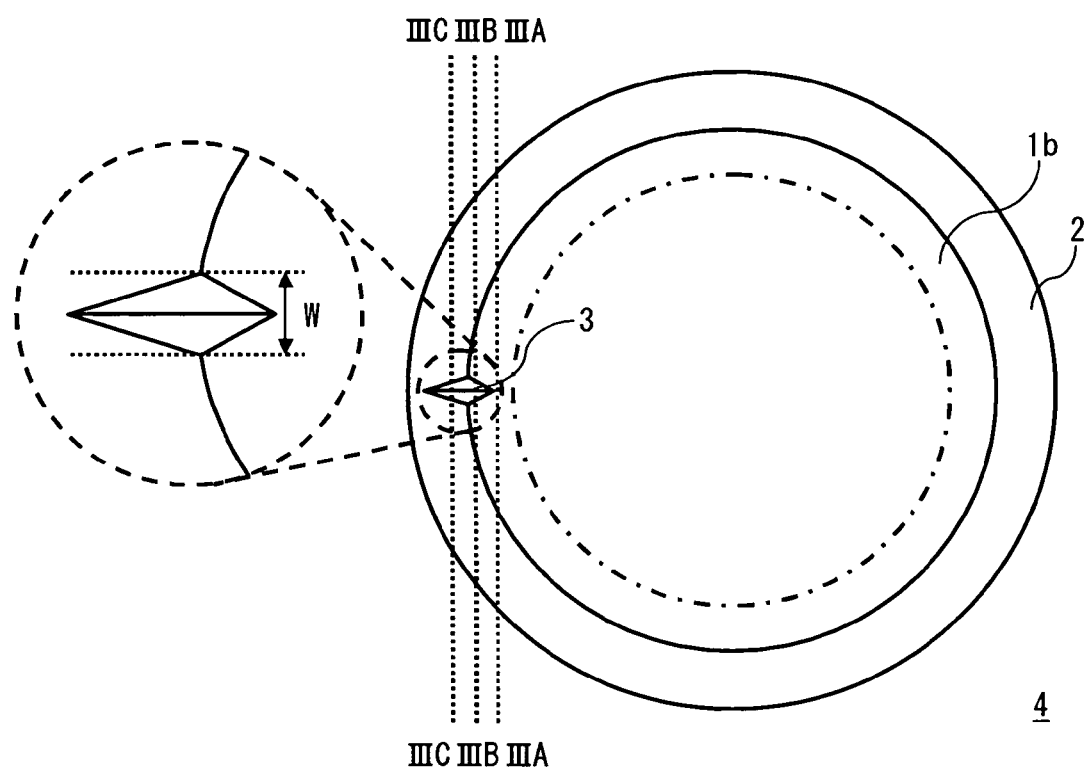
FIG. 1A is a top view of a glass lens according to a first embodiment of the present invention.
Figure 1B:
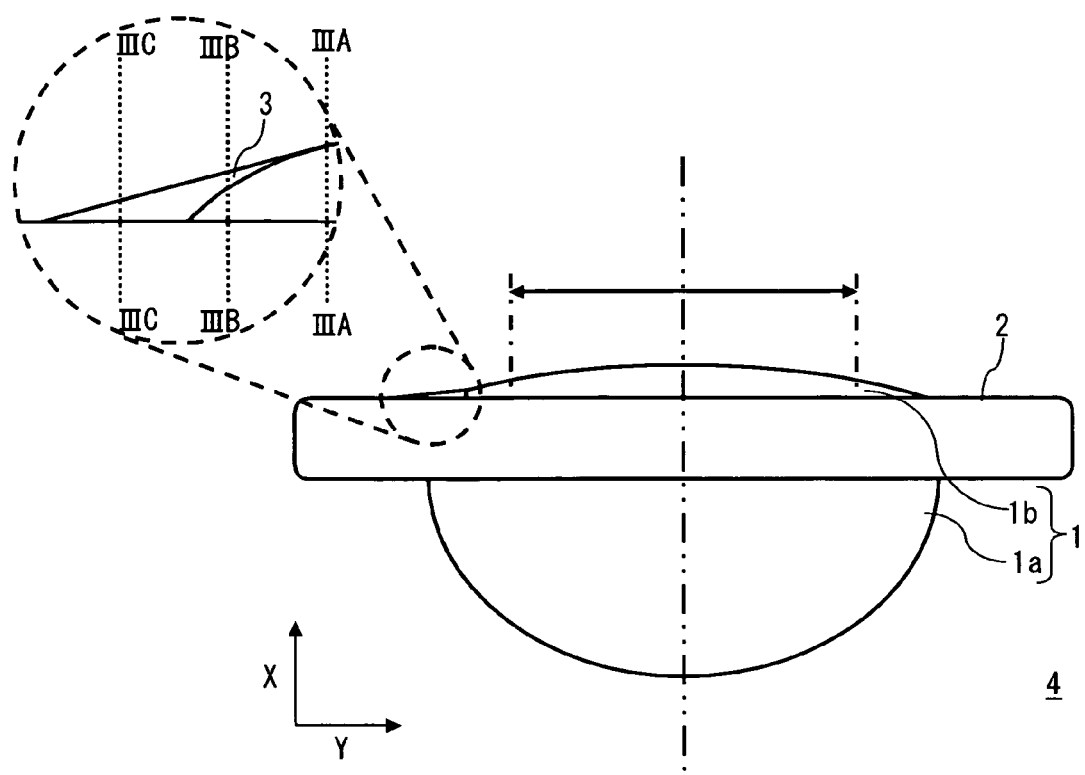
FIG. 1B is a side view of a glass lens according to the first embodiment of the present invention.
Figure 2:
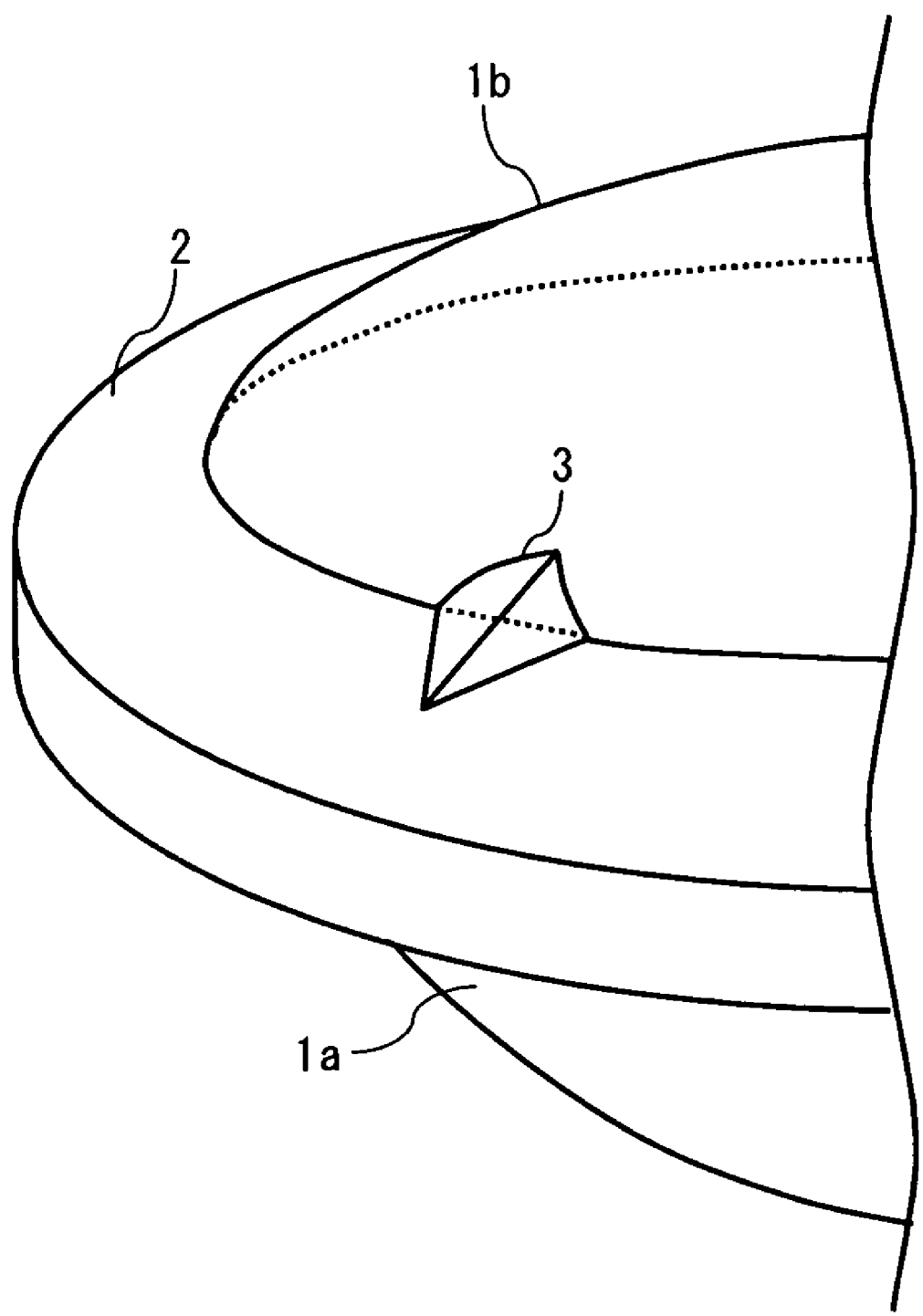
FIG. 2 is an enlarged perspective view of a marking portion of a glass lens according to the first embodiment of the present invention.

A molded lens according to an embodiment of the present invention is described hereinafter with reference to FIGS. 1A, 1B and 2. FIG. 1A is a top view of a glass lens 4. FIG. 1B is a side view of the glass lens 4. FIGS. 1A and 1B also show a part which illustrates a sectional structure of a marking portion 3 in larger scale. FIG. 2 is an enlarged perspective view of the marking portion 3 of the glass lens 4.

The glass lens 4 that is made of glass is described hereinafter as an example of a molded lens. However, lens material is not limited to glass, and it may be plastic. An aspherical lens is described hereinafter as an example of the glass lens 4. An aspherical lens may be used as a pickup lens. A pickup lens is used for an optical pickup device in an optical disc apparatus.

The glass lens 4 includes an optical functional portion 1, a flange portion 2, and the marking portion 3.

The optical functional portion 1 is a part that optically functions. The optical functional portion 1 is a lens in a narrow sense, while the glass lens 4 is a lens in a broad sense.

The optical functional portion 1 includes a first optical functional portion 1a and a second optical functional portion 1b which are placed opposite to each other The first optical functional portion 1a and the second optical functional portion 1b have a common optical axis. FIG. 1B indicates the optical axis in a chain double-dashed line.

The first optical functional portion 1a and the second optical functional portion 1b have a convex shape. Specifically, when viewing FIG. 1B from the front, the optical functional portion 1 includes the convex-shaped first optical functional portion 1a on the under surface of the flange portion 2 and the convex-shaped second optical functional portion 1b on the top surface of the flange portion 2. The thickness of the first optical functional portion 1a along the optical axis is larger than the thickness of the second optical functional portion 1b along the optical axis.

The first optical functional portion 1a has an incident surface through which a laser beam enters. The second optical functional portion 1b has an exit surface through which a laser beam exits. The light that is incident on the first optical functional portion 1a and exists from the second optical functional portion 1b is converged as it propagates along the optical axis. The under surface of the optical functional portion 1 is a light incident surface, and the top surface thereof is a light exit surface.

The diameter of the region of the optical functional portion 1 through which light actually passes when the glass lens 4 is mounted on an optical pickup apparatus or the like is called an effective diameter. When the glass lens 4 is attached to a holder of an optical pickup apparatus, light which is restricted by an aperture that is placed in the holder is incident on the glass lens 4. In other words, light in a spot shape corresponding to the aperture of the holder is incident on the glass lens 4. In this example, the spot shape of the light which is incident on the glass lens 4 is circular when viewed from above. The diameter of the circular region is an effective diameter. FIGS. 1A and 1B indicate the effective diameter by alternate long and short dashed lines.

The flange portion 2 is a plate-shaped part which is located on the periphery of the optical functional portion 1 of the glass lens 4. The flange portion 2 is formed on the entire perimeter of the optical functional portion 1. The glass lens 4 is attached to an optical pickup device when the flange portion 2 is fixed to the holder.

The marking portion 3 is located outside of the effective diameter of the optical functional portion 1. In this example, the marking portion 3 is placed on the surface of the second optical functional portion 1b which is outside of the effective diameter and on the flange portion 2. The marking portion 3 extends from the center (optical axis) of the optical functional portion 1 toward the outer peripheral edge of the flange portion 2 (in the radial direction). Specifically, the marking portion 3 extends from a part of the surface of the second optical functional portion 1b which is outside of the effective diameter toward the flange portion 2. Thus, the marking portion 3 is formed beginning from some point on the convex-shaped inclined plane of the second optical functional portion 1b to the flat-shaped flange portion 2. In other words, the marking portion 3 is a projecting part with one end coupled to the optical functional portion 1 and extending in the direction away from the optical axis.

In this embodiment, the marking portion 3 is placed outside of the effective diameter of the optical functional portion 1. This suppresses the degradation of the optical characteristics of the glass lens 4. In light of lens accuracy and mounting accuracy, it is preferred to form the marking portion 3 not in close proximity to the effective diameter but slightly outside of the effective diameter. For example, the marking portion 3 is preferably away from the effective diameter by 0.03 mm or more. If the optical characteristics of the glass lens 4 can be sacrificed, the marking portion 3 may be formed inside the effective diameter.

FIGS. 1A and 1B show an X axis and a Y axis. The X axis is an axis line that is parallel with the optical axis of the glass lens 4. The Y axis is an axis line that is perpendicular to the X axis. The optical axis of the glass lens 4 passes through the center of the optical functional portion 1. The radial direction described above is an axis line that is parallel with the Y axis. If the top surface of the flange portion 2 is a reference plane, the height of the marking portion 3 gradually decreases from the beginning point toward the outside. In other words, the height of the marking portion 3 in the optical axis direction becomes smaller as it is away from the optical axis.

The top surface of the marking portion 3 is inclined as shown in FIG. 1B. The length of the marking portion 3 on the inner side is longer than that on the outer side. The length is equal to the width along the axis lines IIIA, IIIB and IIIC which are indicated by dotted lines in FIG. 1A. The width of the marking portion 3 gradually becomes narrower toward the outside. The shape of the marking portion 3 when viewed from above is substantially triangular. Thus, the marking portion 3 of this embodiment has a tapered, triangular pyramid shape. The two top surfaces of the triangular pyramid shaped marking portion 3 have the inner sides being coupled to each other and are in contact with the second optical functional portion 1b and the flange portion 2, respectively.

The diameter of the glass lens 4 (including the flange portion 2) is 3 to 6 mm, for example. The diameter of the optical functional portion 1 is 2 to 5 mm, for example.

In the glass lens 4, the cross-sectional shape of the glass lens 4 along a given first plane includes the cross-sectional shape along a given second plane which is farther from the optical axis than the first plane is in the Y axis direction. The cross-sectional shape is a shape which is viewed in the cross section of the glass lens 4 that has the marking portion 3 on a plane that is parallel with the optical axis.

Figure 3A:
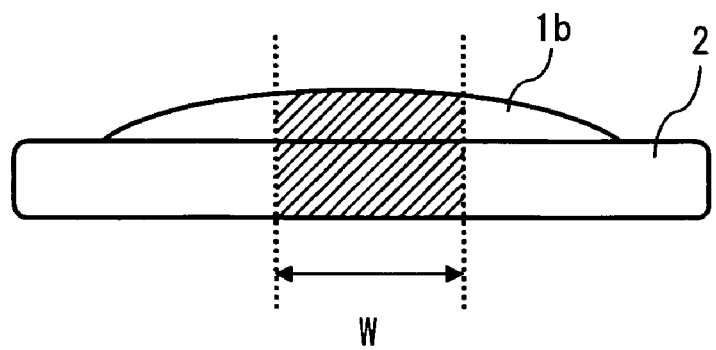
FIGS. 3A to 3C are sectional views of the glass lens shown in FIGS. 1A and 1B.
Figure 3B:
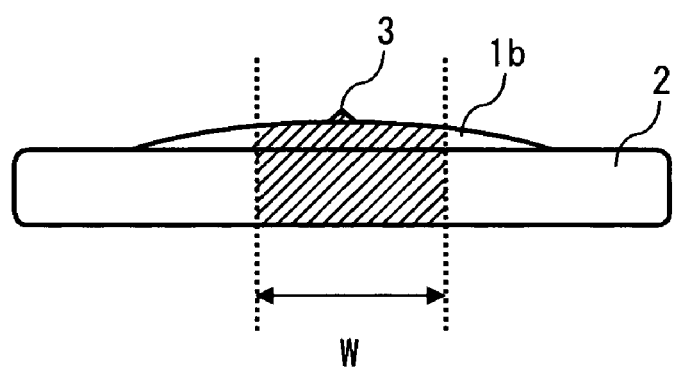
Figure 3C:
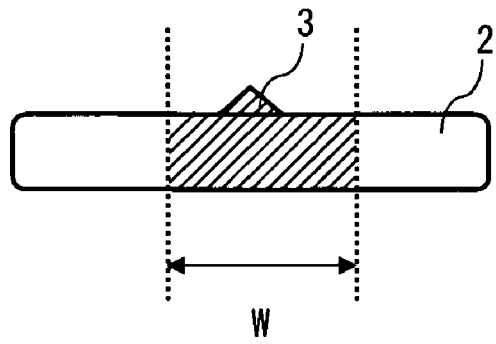

The cross-sectional shape of the glass lens 4 is described in further detail with reference to FIGS. 3A to 3C. FIGS. 3A to 3C are cross-sectional views of the glass lens 4 of FIGS. 1A and 1B. In FIGS. 3A to 3C, the first optical functional portion 1a is not illustrated for the sake of simplification.

As shown in FIGS. 1A and 1B, a plane IIIA-IIIA, a plane IIIB-IIIB and a plane IIIC-IIIC are set from the optical axis (the center of the glass lens 4) side. Thus, these planes each are located at a different distance away from the optical axis in the radial direction. The plane IIIA-IIIA, the plane IIIB-IIIB and the plane IIIC-IIIC are parallel with the X axis and perpendicular to the Y axis. The plane IIIA-IIIA, the plane IIIB-IIIB and the plane IIIC-IIIC are in parallel with each other. The plane IIIB-IIIB and the plane IIIC-IIIC each have a cross-sectional plane of the marking portion 3.

FIG. 3A shows a cross-sectional shape of the glass lens 4 along the plane IIIA-IIIA. FIG. 3B shows a cross-sectional shape of the glass lens 4 along the plane IIIB-IIIB. FIG. 3C shows a cross-sectional shape of the glass lens 4 along the plane IIIC-IIIC.

As shown in FIGS. 3A to 3C, the cross-sectional shape of the glass lens 4 becomes smaller as it is away from the optical axis, i.e. in the order from FIG. 3A to FIG. 3C.

Thus, the cross-section that is close to the optical axis includes the cross-section that is away from the optical axis. Specifically, the cross-sectional shape of FIG. 3A includes the cross-sectional shape of FIG. 3B. The cross-sectional shape of FIG. 3B includes the cross-sectional shape of FIG. 3C.

If the cross-sectional shape of FIG. 3B and the cross-sectional shape of FIG. 3A are overlapped by shifting them in parallel in the Y axis direction, the cross-sectional shape of FIG. 3B is covered by the cross-sectional shape of FIG. 3A. Likewise, the cross-sectional shape of FIG. 3C is covered by the cross-sectional shape of FIG. 3B. The cross-sectional shape of FIG. 3C is also covered by the cross-sectional shape of FIG. 3A.

In this way, the "inclusion" of the cross-section indicates the state where one cross-sectional shape is covered by another cross-sectional shape when cross sections to be compared are shifted in parallel perpendicularly to the cross sections. In the "inclusion", an outer cross-section may be smaller or the same as a given cross-section.

The comparison of the cross-sectional shapes is not necessarily performed by limiting to the optical functional portion 1, the flange portion 2 and the marking portion 3. The comparison of the cross-sectional shapes may be performed by limiting to the marking portion 3. Further, the comparison of the cross-sectional shapes may be performed by limiting to the region above the top surface of the flange portion 2, which is the light exist side.

It is also possible to make comparison of the cross-sectional shapes of the plane which is parallel with the optical axis (X axis) and perpendicular to the Y axis, includes the marking portion 3 and has a maximum width with the marking portion 3 in the center thereof. The width direction is a direction which is perpendicular to the radial axis (Y axis) including the marking portion 3. The maximum width is a maximum width of the marking portion 3 in the width direction.

In FIGS. 1A and 1B and FIGS. 3A to 3C, the maximum width of the marking portion 3 is designated by W. At least in the shaded area of FIGS. 3A to 3C, the cross-sectional shape that is closer to the optical axis in the Y axis direction includes the cross-sectional shape that is farther from the optical axis.

Specifically, in the shaded area of FIGS. 3A to 3C, the cross-sectional shape of FIG. 3A includes the cross-sectional shape of FIG. 3B. Likewise, the cross-sectional shape of FIG. 3B includes the cross-sectional shape of FIG. 3C. Thus, the cross-sections have the relationship that the cross-sectional shape of the marking portion 3 along a given first plane includes the cross-sectional shape of the marking portion 3 along a given second plane that is farther from the optical axis than the first plane is in the Y axis direction. This is the same for the embodiments described later.

Because the glass lens 4 has the above shape, it is possible to prevent the chipping of the marking portion 3 due to contact with a molding tool during cooling in the manufacturing process.

The marking portion 3 enables identification of a molding tool, a cavity, an injection molding device or the like. If two marking portions 3 are formed in such a way that their relative positions differ, it is possible to identify a lens that is fabricated by a different manufacturing jig or the like. For example, when identifying a cavity with the marking portion, the marking portions may be placed in a relative position that differs by cavity. For a specific example, in a first cavity, the marking portions may be placed in the positions where an angle which is formed by the lines connecting the center of the glass lens 4 with each marking portion is 180 degrees. In a second cavity, the marking portions may be placed in circumferentially different positions where the angle is 120 degrees. The first cavity and the second cavity can be thereby distinguished from each other.

Although the marking portion 3 has a triangular pyramid shape in this example, the present invention is not limited thereto. For example, the marking portion 3 may have a polygonal pyramid shape, a conical shape, or a semicircular shape. In such cases, the cross section of the projecting part of the marking portion 3 along the plane which is parallel with the optical axis is a substantially N-gonal shape (N is an integer of 3 or above) or a substantially semicircular shape.

The shape of the marking portion 3 when viewed from above may be substantially triangular, trapezoidal, semicircular or semielliptic. The height of the marking portion 3 gradually decreases toward the outside from the beginning point. The width of the marking portion 3 gradually narrows toward the outside in the cross section of the marking portion 3 along the plane which is perpendicular to the X axis.

Although the shape of the marking portion 3 is triangular pyramid so that the height and the width of the marking portion 3 decrease at a constant rate in this embodiment, the present invention is not limited thereto. For example, the height and the width of the marking portion 3 may decrease in stages. Two or more making portions may be used for identification, or the marking portions may have different shapes in units for identification.

Further, although the marking portion 3 is located on the second optical functional portion 1b of the optical functional portion 1 in this embodiment, the marking portion 3 may be located on the first optical functional portion 1a of the optical functional portion 1. However, the margin for the effective diameter of the optical functional portion 1 is smaller on the first optical functional portion 1a than on the second optical functional portion 1b. It is thus preferred to form the marking portion 3 on the second optical functional portion 1b than on the first optical functional portion 1a. Further, placing the marking portion 3 on the second optical functional portion 1b of the optical functional portion 1 allows easy visual check of the marking portion 3 with the glass lens 4 being attached to the holder.

Although the marking portion 3 does not extend to the outer edge of the flange portion 2 in FIGS. 1A, 1B and 2, the marking portion 3 may extend to the outer edge of the flange portion 2. In this case, the height from the top surface of the flange portion 2 to the point of intersection between the marking portion 3 and the second optical functional portion 1b, which is to the beginning point of the marking portion 3, may increase toward the outside as long as the marking portion 3 is not higher than the top surface of the second optical functional portion 1b.

Figure 4A:
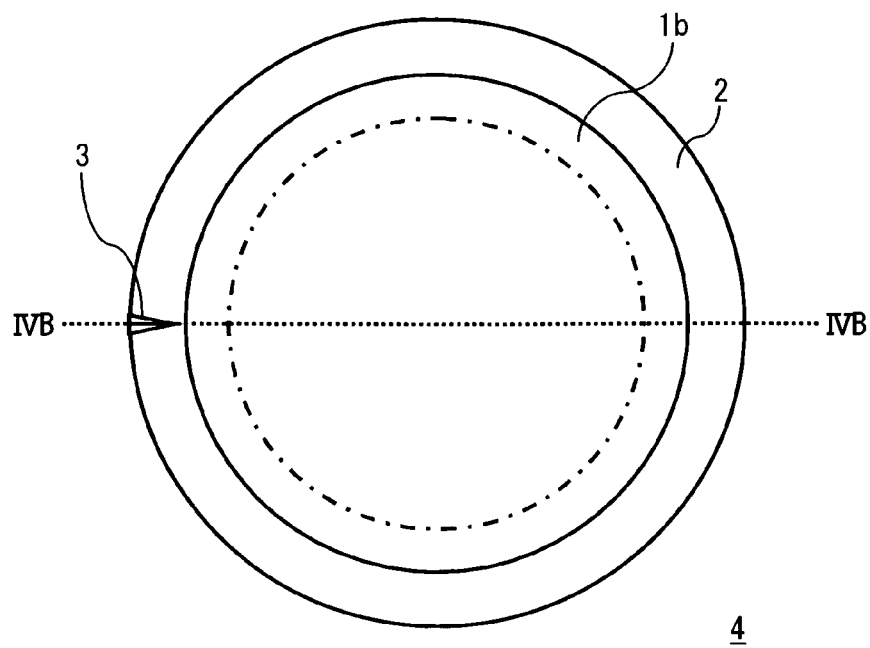
FIG. 4A is a top view of another glass lens according to the first embodiment of the present invention.
Figure 4B:
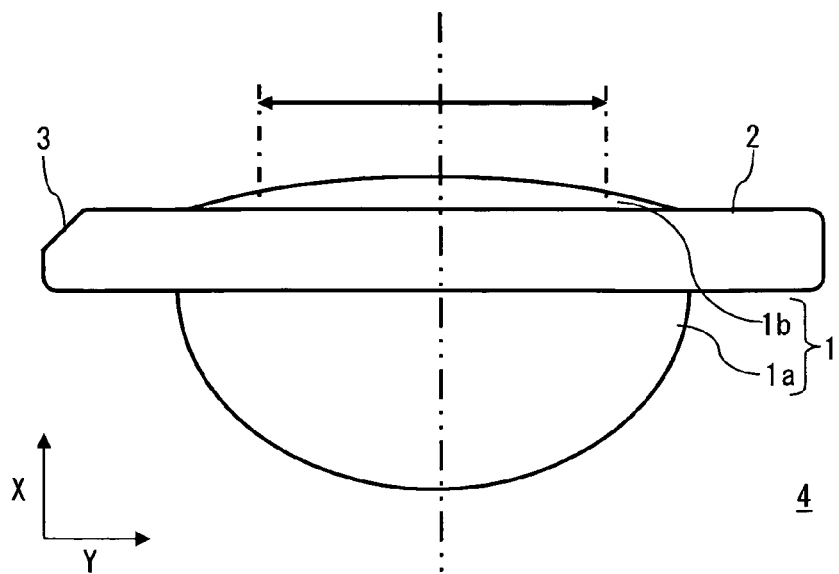
FIG. 4B is a side view of another glass lens according to the first embodiment of the present invention.
Figure 5:
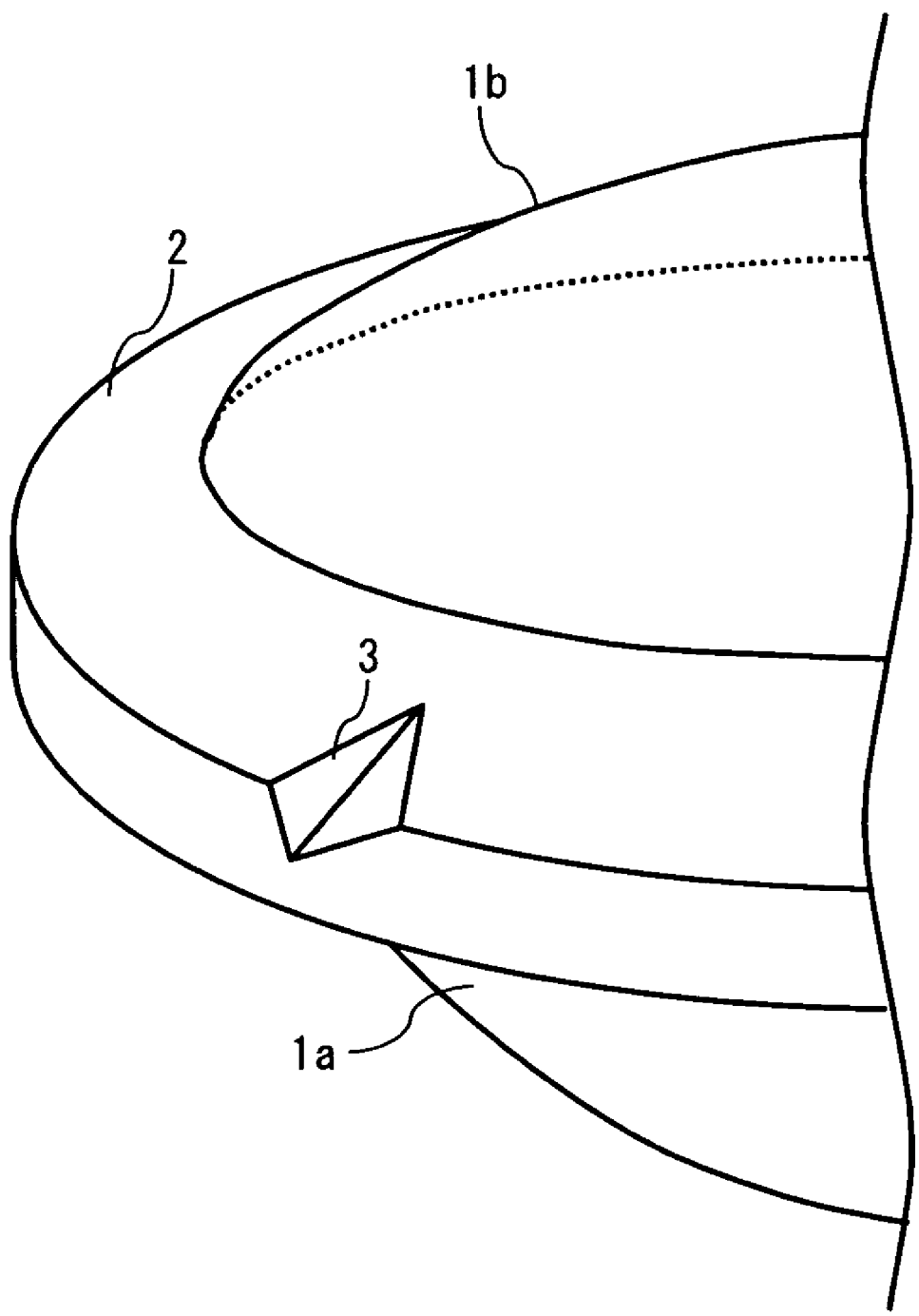
FIG. 5 is an enlarged perspective view of a marking portion of another glass lens according to the first embodiment of the present invention.

Further, although the marking portion 3 has a projecting triangular pyramid shape, it may be a depressed (groove) shape. The glass lens 4 having a groove-shaped marking portion 3 is described hereinafter with reference to FIGS. 4A, 4B and 5. FIG. 4A is a top view of the glass lens 4. FIG. 4B is a cross-sectional view of the glass lens 4 along line IVB-IVB in FIG. 4A. FIG. 5 is an enlarged perspective view of the marking portion 3 of the glass lens 4.

In this case also, the marking portion 3 is located outside of the effective diameter of the optical functional portion 1. The marking portion 3 is placed on the surface of the second optical functional portion 1b which is outside of the effective diameter and/or on the flange portion 2 in the radial direction from the optical axis of the optical functional portion 1 toward the flange portion 2. The marking portion 3 is formed as a groove which extends to the outer edge of the flange portion 2. Thus, the marking portion 3 is a depressed part which is formed on the flange portion 2. One end of the marking portion 3 is coupled to the edge of the flange portion 2.

In FIGS. 4A, 4B and 5, the marking portion 3 is located on the flange portion 2. The marking portion 3 is placed from the center of the optical functional portion 1 in the radial direction toward the flange portion 2. The marking portion 3 is a groove which extends to the outer edge of the flange portion 2.

The marking portion 3 has a part in which the length on the inner side is shorter than the length on the outer side. The length indicates the length of the marking portion 3 in the direction intersecting with the radial direction of the optical functional portion 1 in the cross-section perpendicular to the X axis when viewed from above. In this case, the depth of the marking portion 3 gradually increases toward the outside. In other words, the depth of the depressed part of the marking portion 3 decreases from the edge of the flange portion 2 toward the optical axis of the optical functional portion 1. The width of the marking portion 3 is constant or becomes larger toward the outside.

Although the marking portion 3 is placed only on the flange portion 2 in this example, it is not limited thereto. For example, like the projecting marking portion 3 shown in FIGS. 1A, 1B and 2, the marking portion 3 may be formed beginning at a part of the surface of the second optical functional portion 1b which is outside of the effective diameter and extend to the outer edge of the flange portion 2. When forming the marking portion 3 as a groove, the end of the marking portion 3 needs to reach the outer edge of the flange portion 2, unlike the projecting-type marking portion 3 shown in FIGS. 1A, 1B and 2. This is for the purpose of preventing the chipping of the groove during cooling.

In the glass lens 4 having such a groove as well, the cross-sectional shape along a given first plane includes the cross-sectional shape along a given second plane that is farther from the optical axis than the first plane is in the Y axis direction. The cross-sectional shape is a shape which is viewed in the cross section of a part including the optical functional portion 1, the flange portion 2 and the marking portion 3 along a plane that is parallel with the optical axis.

When the glass lens 4 does not have the flange portion 2, the marking portion 3 may be placed only on the second optical functional portion 1b. In such a case, the marking portion 3 is formed outside of the effective diameter of the second optical functional portion 1b. The marking portion 3 extends from the center of the optical functional portion 1 in the radial direction toward the outer end of the optical functional portion 1. In the glass lens 4 of such configuration as well, the cross-sectional shape along a given first plane includes the cross-sectional shape along a given second plane that is farther from the optical axis than the first plane is in the Y axis direction. The cross-sectional shape in this case is also defined in the same manner as above.

When forming the depressed marking portion 3 on the glass lens 4 which does not have the flange portion 2, the marking portion 3 is formed in such a way that one end of the marking portion 3 reaches the end of the second optical functional portion 1b. It is preferred that one end of the marking portion 3 is coupled to the edge of the optical functional portion 1 (specifically, the second optical functional portion 1b).

In this manner, it is possible to form the marking portion 3 only on the second optical functional portion 1b. However, it is more preferred to form the marking portion 3 from the second optical functional portion 1b to the flange portion 2. This enlarges the marking portion 3 to enable easier visual check, thereby permitting easier identification of the marking portion 3.

Although the top surface of the second optical functional portion 1b protrudes from the flange portion 2 in this embodiment, the present invention is not limited thereto. For example, the top surface of the flange portion 2 may be higher than the top surface of the second optical functional portion 1b. Further, it is not necessary that both of the first optical functional portion 1a and the second optical functional portion 1b are convex-shaped, as long as at least one side of the optical functional portion 1 where the marking portion 3 is located has a convex shape.

In this embodiment, the marking portion 3 is located on the second optical functional portion 1b. Thus, at least the second optical functional portion 1b maybe convex shaped. In such a case, the first optical functional portion 1a may be a concave curved surface (concave shape) having a very gradual inclination. In the case where the first optical functional portion 1a is concave shaped and the second optical functional portion 1b is convex shaped as well, the cross-sectional shape along a given first plane includes the cross-sectional shape along a given second plane which is farther from the optical axis than the first plane is in the Y axis direction.

In this case also, the cross-sectional shape is a shape which is in the cross section of a part including the second optical functional portion 1b, the flange portion 2 and the marking portion 3 along a plane that is parallel with the optical axis. The shape or the position of the marking portion 3 is set so as to prevent the deformation of the marking portion 3 by contact with a molding tool due to shrinkage of material during cooling.

Figure 6A:
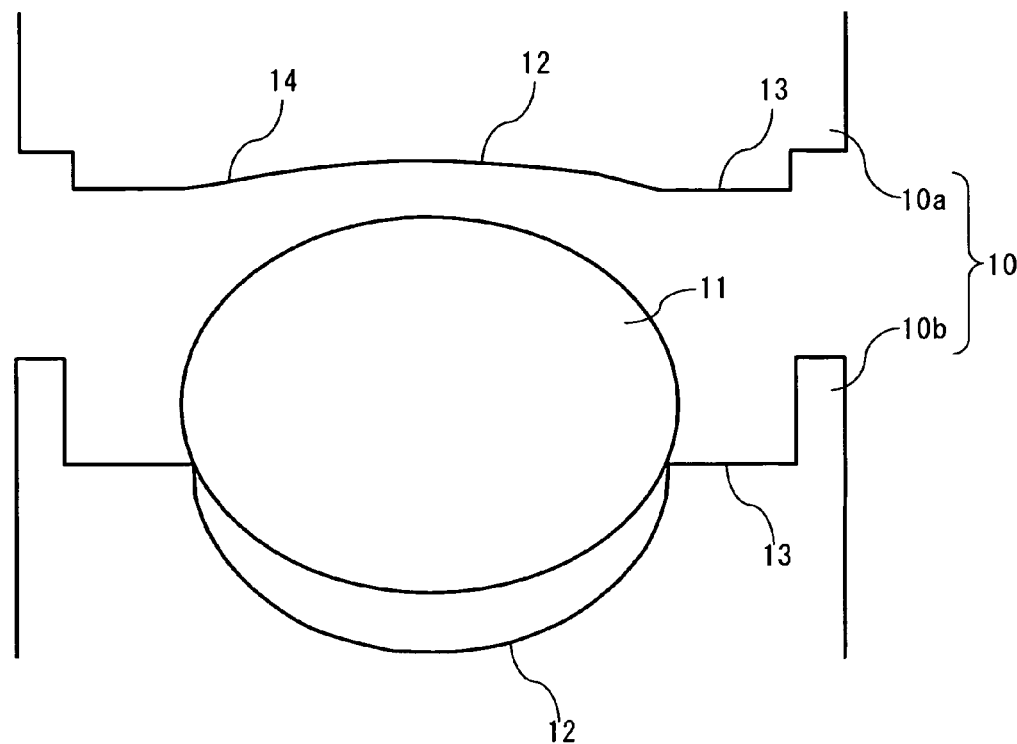
FIGS. 6A and 6B are sectional views showing a method of manufacturing a glass lens according to the first embodiment of the present invention.
Figure 6B:
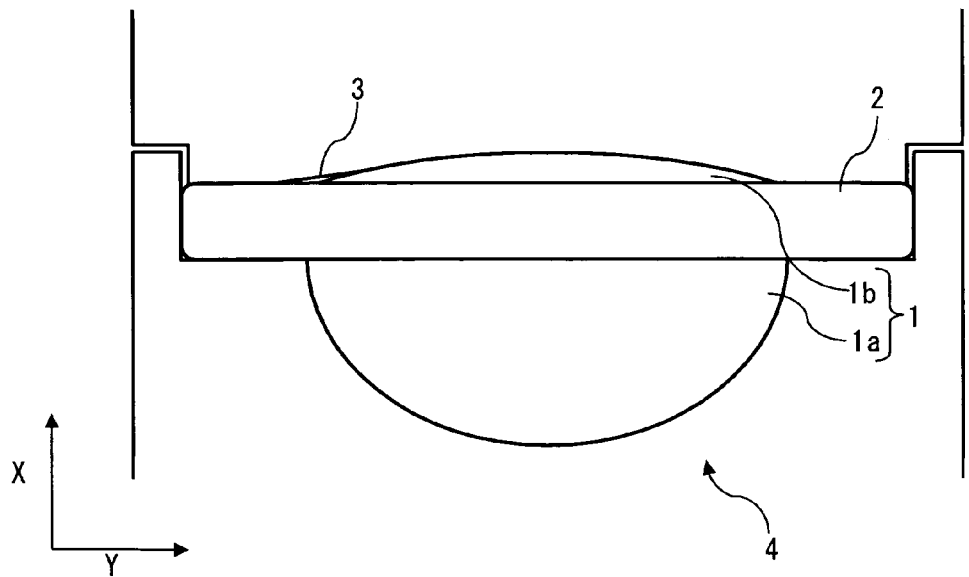
Figure 7:
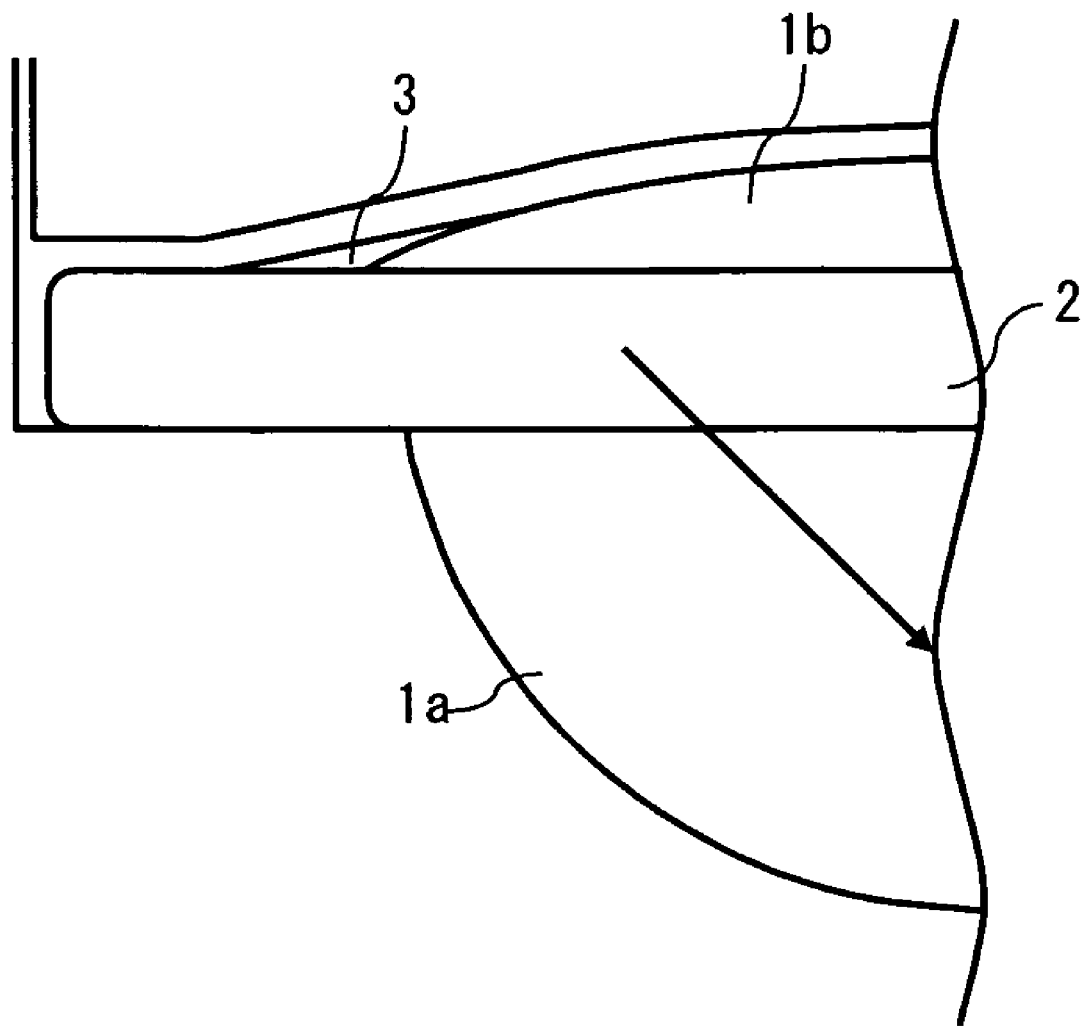
FIG. 7 is an enlarged sectional view of a marking portion of a glass lens according to the first embodiment of the present invention.

A method of manufacturing the glass lens 4 according to this embodiment is described hereinafter with reference to FIGS. 6A, 6B and 7. The following method manufactures the glass lens 4 by the molding using a molding die 10 as a molding tool. FIGS. 6A and 6B are sectional views showing the manufacturing method of the glass lens 4. FIG. 7 is an enlarged sectional view of the marking portion 3 of the glass lens 4.

The method first produces the molding die 10. The molding die 10 is formed to have a shape corresponding to a shape of a molded item (the glass lens 4). The molding die 10 includes an optical functional portion molding part 12, a flange molding part 13, and a marking molding part 14. The optical functional portion molding part 12 is placed on the upper mold 10a and the lower mold 10b of the molding die 10. The optical functional portion molding part 12 has a concave shape so as to correspond to a convex shape of the optical functional portion 1. In this example, the upper mold 10a corresponds to the second optical functional portion 1b, and the lower mold 10b corresponds to the first optical functional portion 1a. The flange molding part 13 is placed on the outer periphery of the optical functional portion molding part 12. The flange molding part 13 is placed in zonal form on the entire circumference. The marking molding part 14 is placed outward from a part of the optical functional portion molding part 12 as a beginning point. Specifically, the marking molding part 14 extends from the optical functional portion molding part 12 on the upper mold 10a of the molding die 10 to the flange molding part 13. The marking molding part 14 is V-shaped so as to correspond to the shape of the marking portion 3. The marking molding part 14 is formed by turning and shaving a wedge-shaped diamond machine tool or the like.

Next, glass material 11 is supplied to the lower mold 10b of the molding die 10 as shown in FIG. 6A. The glass material 11 is then heated and softened. When heated, the glass material 11 and the molding die 10 thermally expand. The coefficient of thermal expansion of the molding die 10 is $5.7 \times 10^{-6}/°$ C. to $6.5 \times 10^{-6}/°$ C. The coefficient of thermal expansion of the glass material 11 is $8.0 \times 10^{-6}/°$ C. to $20 \times 10^{-6}/°$ C. Thus, the coefficient of thermal expansion of the glass material 11 is larger than that of the molding die 10. Accordingly, the glass material 11 expands more significantly than the molding die 10 does during heating. After that, pressure is applied to the glass material 11 by the upper mold 10a and the lower mold 10b of the molding die 10. The glass material 11 is thereby filled between the upper mold 10a and the lower mold 10b as shown in FIG. 6B. The glass material 11 is thereby molded into a shape corresponding to the molding die 10.

Then, the glass material 11 is cooled with the molding die 10 and the glass material 11 being in close contact with each other as shown in FIG. 6B. As described above, the molding die 10 and the glass material 11 thermally expand when heated. Thus, the molding die 10 and the glass material 11 shrink toward the center when cooled. As described earlier, the coefficient of thermal expansion is larger in the glass material 11 than in the molding die 10. Thus, the degree of shrinkage during cooling is larger in the glass material 11 than in the molding die 10. If the molding die 10 and the glass material 11 are compared, the glass material 11 shrinks more significantly toward the center in the direction of the arrow shown in FIG. 7. The cross-sectional shape of the glass lens 4 becomes smaller toward the outside. Specifically, the cross-sectional shape of the marking portion 3 along a given first plane includes the cross-sectional shape of the marking portion 3 along a given second plane which is farther from the optical axis than the first plane is. Each part of the molding die 10 has a shape corresponding to the above shape. The shape or the position of the marking molding part 14 is set so as to prevent the deformation of the marking portion 3 by contact with the molding die 10 due to the shrinkage of the glass material 11 during cooling. Therefore, even if the glass material 11 shrinks centerward, the marking portion 3 does not come into contact with the molding die 10. It is thereby possible to prevent the deformation of the marking portion 3, such as chipping. The glass lens 4 is manufactured as described above. Although the direction of shrinkage of the glass lens 4 differs by part to be exact, the direction of shrinkage can be assumed to be perpendicular to the optical axis in the glass lens 4 as described above. It is therefore possible to avoid the chipping of the marking portion 3 by setting the shape in which the cross-sectional shape along a given first plane on the center side includes the cross-sectional shape along a given second plane on the outer side.

The above-described embodiment previously forms the marking molding part 14 which corresponds to the marking portion 3 on the molding die 10, thereby integrally molding the marking portion 3. It is thus possible to mold the marking portion 3 without a need for an additional step. This enables simple and accurate formation of the marking portion 3. This further improves productivity and reduces costs.

Second Embodiment

Figure 8A:
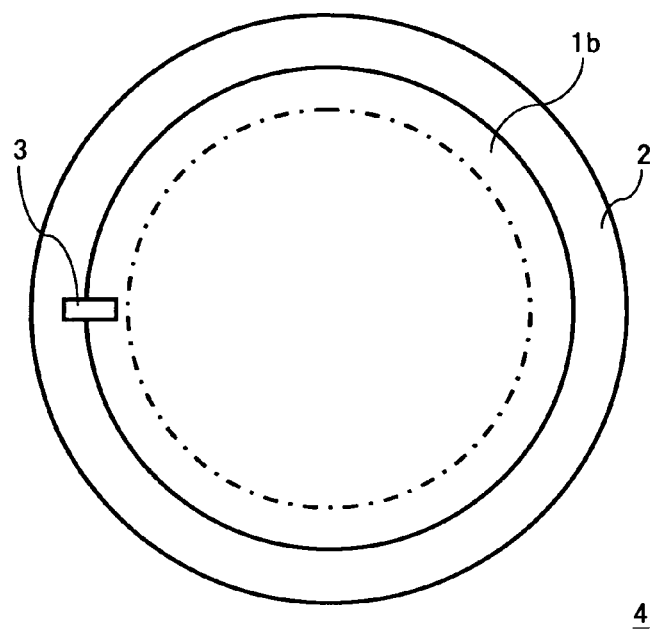
FIG. 8A is a top view of a glass lens according to a second embodiment of the present invention.
Figure 8B:
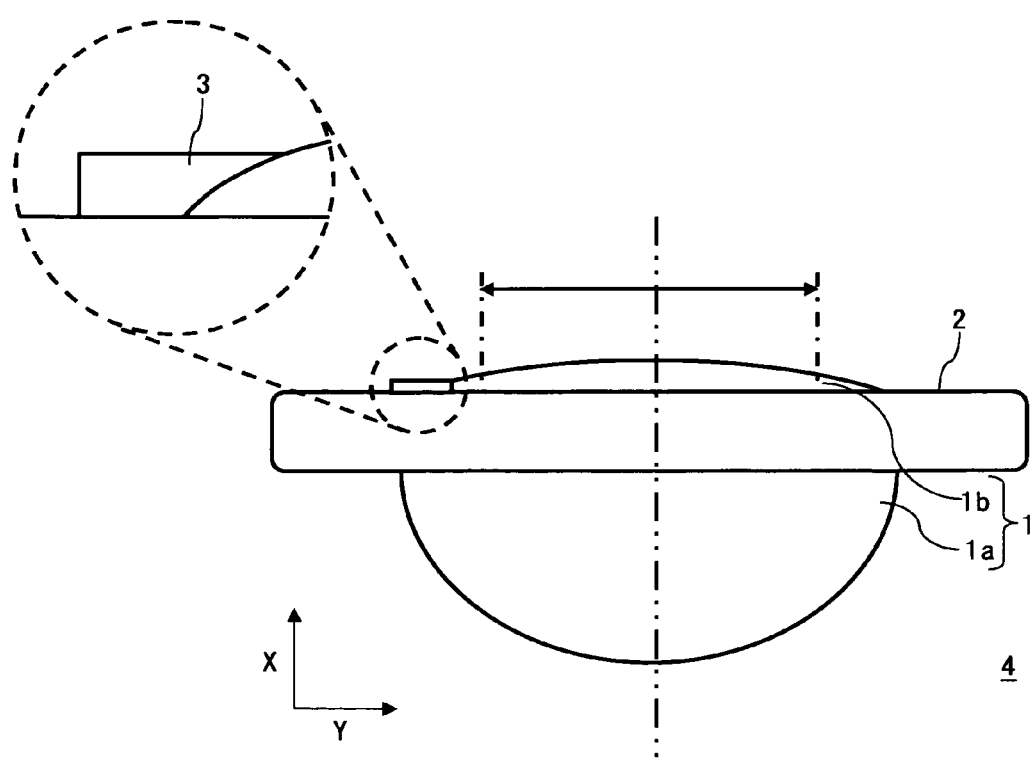
FIG. 8B is a side view of a glass lens according to the second embodiment of the present invention.
Figure 9:
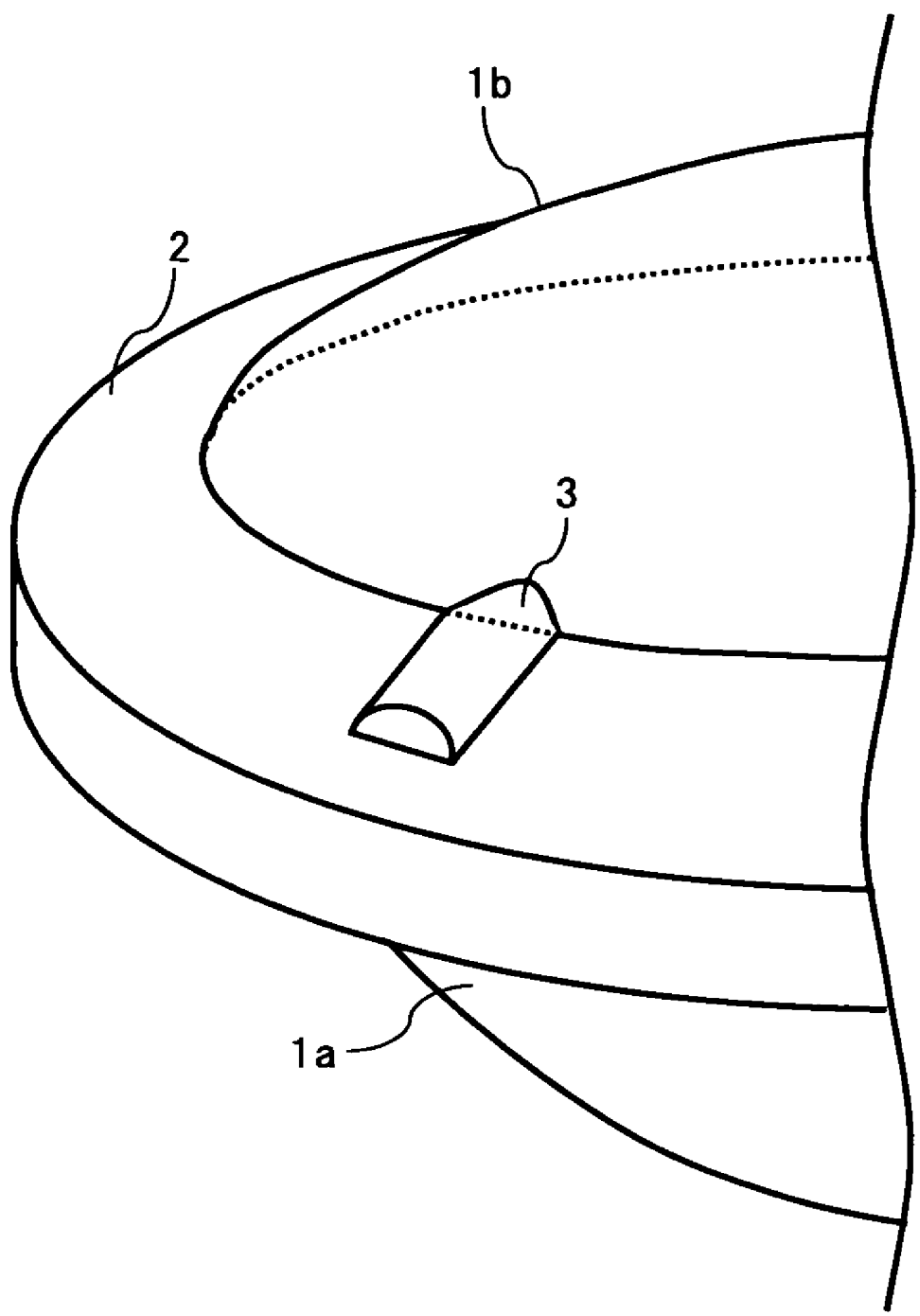
FIG. 9 is an enlarged perspective view of a marking portion of a glass lens according to the second embodiment of the present invention.

A molded lens according to another embodiment of the present invention is described hereinafter with reference to FIGS. 8A, 8B and 9. The same description as in the first embodiment is not provided herein. The glass lens 4 is described hereinafter as an example of a molded lens. FIG. 8A is a top view of the glass lens 4. FIG. 8B is a side view of the glass lens 4. In FIG. 8B, a partly enlarged view shows the cross section of the marking portion 3. FIG. 9 is an enlarged perspective view of the marking portion 3 of the glass lens 4.

The glass lens 4 includes the optical functional portion 1, the flange portion 2 and the marking portion 3. The optical functional portion 1 includes the first optical functional portion 1a and the second optical functional portion 1b. The optical functional portion 1 and the flange portion 2 are the same as those in the first embodiment and thus not described herein. The marking portion 3 is placed on the surface of the second optical functional portion 1b which is outside of the effective diameter and on the flange portion 2.

The marking portion 3 is placed from the center of the optical functional portion 1 (which is the optical axis) toward the outer edge of the flange portion 2 in the radial direction. The marking portion 3 extends from a part of the surface of the second optical functional portion 1b which is outside of the effective diameter toward the flange portion 2. Thus, the marking portion 3 is formed beginning from some point on the convex-shaped inclined plane of the second optical functional portion 1b to the flat-shaped flange portion 2. In other words, the marking portion 3 is a projecting part with one end coupled to the optical functional portion 1.

In this embodiment, the height of the marking portion 3 is substantially constant. In other words, the marking portion 3 has a constant height in the optical axis direction as being away from the optical axis. Thus, when viewed from side as shown in FIG. 8B, the top surface of the marking portion 3 is parallel with the top surface of the flange portion 2.

The width of the marking portion 3 on the inner side is equal to the width on the outer side. The width of the marking portion 3 is constant. As shown in FIG. 8A, the shape of the marking portion 3 when viewed from above is substantially rectangular.

In this embodiment, the marking portion 3 has a semi-cylindrical shape. The bottom surface and one side surface of the semi-cylindrical marking portion 3 are in contact with the optical functional portion 1 and the flange portion 2, respectively. The diameter of the glass lens 4 (including the flange portion 2) is 3 to 6 mm, for example. The diameter of the optical functional portion 1 is 2 to 5 mm, for example. The glass lens 4 of this embodiment is composed as described above.

In the above-described glass lens 4, like the first embodiment, the cross-sectional shape along a given first plane includes the cross-sectional shape along a given second plane that is farther from the optical axis than the first plane is in the Y axis direction. The shape or the position of the marking portion 3 is set so as to prevent the deformation of the marking portion 3 by contact with a molding tool due to shrinkage of material during cooling. This embodiment therefore has the same advantage as the first embodiment.

Although the marking portion 3 has a semi-cylindrical shape in this embodiment, it may have a rectangular shape such as a rectangular solid. The cross section of the projecting part of the marking portion 3 along the plane perpendicular to the Y axis is substantially N-gonal shape (N is an integer of 3 or above) or substantially semicircular shape. The height of the marking portion 3 on the outer side may be the same as that of the beginning point. The width of the marking portion 3 is constant on the cross section of the marking portion 3 in the plane perpendicular to the X axis.

There may be a plurality of marking portions 3 as described in the first embodiment. Further, the marking portion 3 may be a depressed (groove) shape. The marking portion 3 may be placed only on the optical functional portion 1. Furthermore, the first embodiment and the second embodiment may be used in combination. For example, the marking portion 3 may have a shape that combines a substantially triangular shape and a substantially rectangular shape when viewed from above. The use of various shapes of marking portion in combination enables an increase in the information given by the marking portions 3.

Figure 10A:
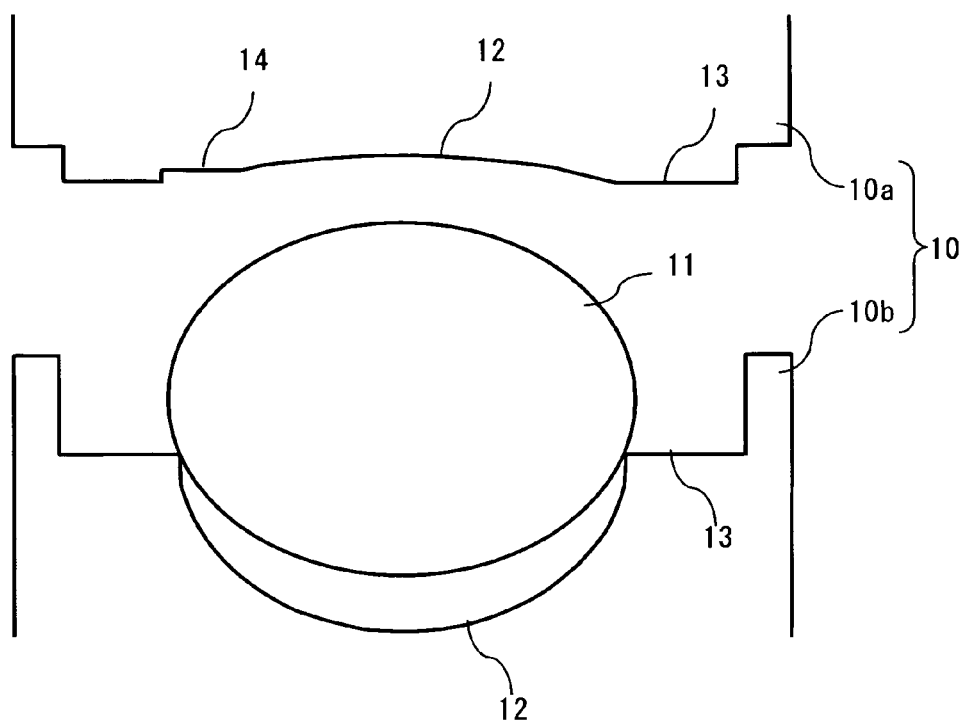
FIGS. 10A and 10B are sectional views showing a method of manufacturing a glass lens according to the second embodiment of the present invention.
Figure 10B:
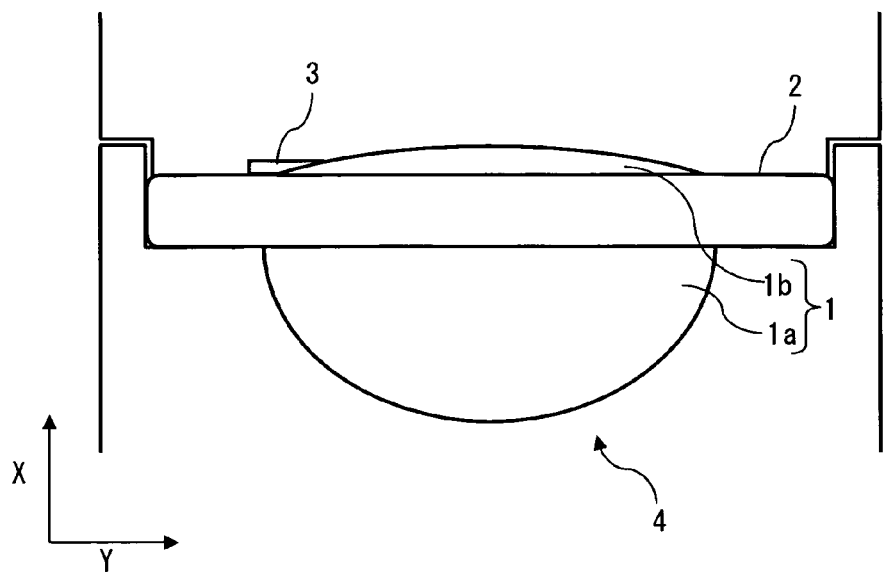
Figure 11:
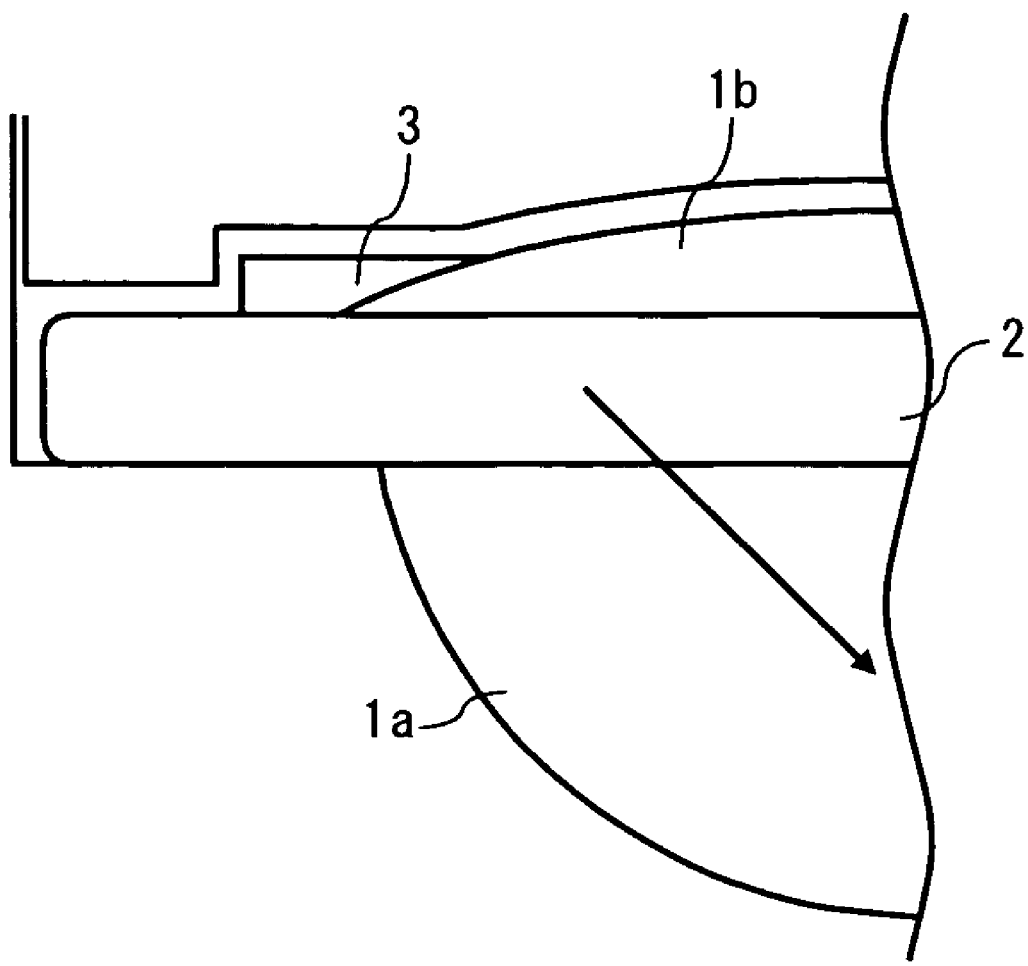
FIG. 11 is an enlarged sectional view of a marking portion of a glass lens according to the second embodiment of the present invention.

A method of manufacturing the glass lens 4 according to this embodiment is described hereinafter with reference to FIGS. 10A, 10B and 11. FIGS. 10A and 10B are sectional views showing the manufacturing method of the glass lens 4. FIG. 11 is an enlarged sectional view of the marking portion 3 of the glass lens 4. The manufacturing method of this embodiment is the same as that of the first embodiment except for the molding die 10 to be used and therefore not described in detail herein.

The method first produces the molding die 10. The molding die 10 is formed to have a shape corresponding to a shape of a molded item, which is the above-described glass lens 4. The molding die 10 includes the optical functional portion molding part 12, the flange molding part 13, and the marking molding part 14. The optical functional portion molding part 12 and the flange molding part 13 are the same as those in the first embodiment. The marking molding part 14 is placed outward from a part of the optical functional portion molding part 12 as a beginning point. Specifically, the marking molding part 14 extends from the optical functional portion molding part 12 of the upper mold 10a of the molding die 10 to the flange molding part 13. The marking molding part 14 is semi-cylindrical shaped so as to correspond to the shape of the marking portion 3. The marking molding part 14 is formed by turning and shaving a wedge-shaped diamond machine tool or the like.

Next, the glass material 11 is supplied to the lower mold 10b of the molding die 10 as shown in FIG. 10A. The glass material 11 is then press-molded as shown in FIG. 10B. At this time, the molding die 10 and the glass material 11 are heated and then cooled. Thus, if the molding die 10 and the glass material 11 are compared as in the first embodiment, the glass material 11 shrinks more significantly toward the center in the direction of the arrow shown in FIG. 11. Further, the cross-sectional shape of the marking portion 3 along a given first plane includes the cross-sectional shape of the marking portion 3 along a given second plane which is farther from the optical axis than the first plane is in the Y axis direction. Each part of the molding die 10 has a shape corresponding to the above shape. The shape or the position of the marking molding part 14 is set so as to prevent the deformation of the marking portion 3 by contact with the molding die 10 due to the shrinkage of the glass material 11 during cooling. Therefore, even if the glass material 11 shrinks more significantly, the marking portion 3 does not come into contact with the molding die 10. It is thereby possible to prevent the deformation of the marking portion 3, such as chipping. The glass lens 4 is fabricated as described above.

The manufacturing method of the glass lens 4 according to this embodiment has the same effect as the manufacturing method according to the first embodiment. In this embodiment, the cross section of the marking portion 3 is semi-cylindrical, and the top surface is curved. This enables easy formation of the marking molding part 14 on the molding die 10.

Third Embodiment

Figure 12A:
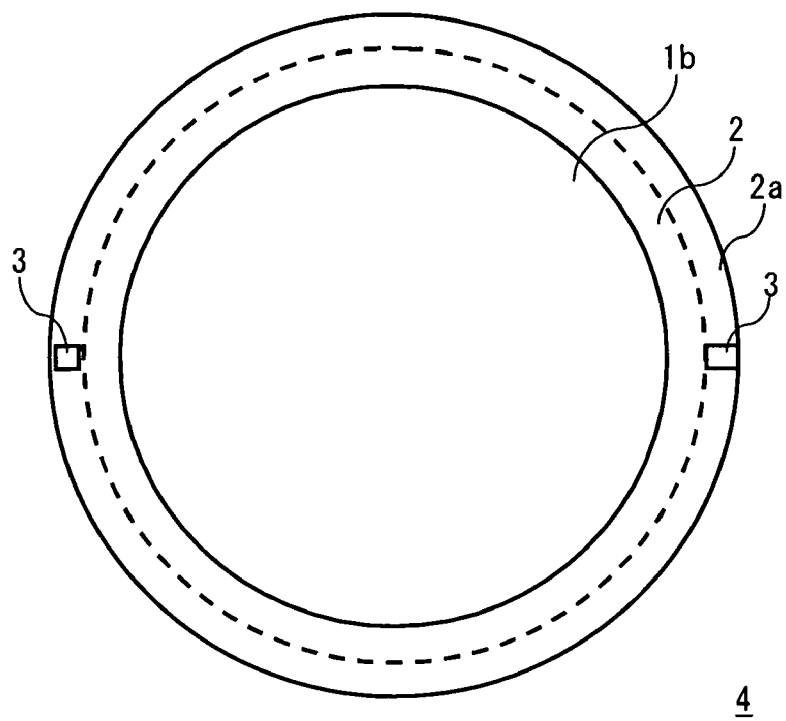
FIG. 12A is a top view of a glass lens according to a third embodiment of the present invention.
Figure 12B:
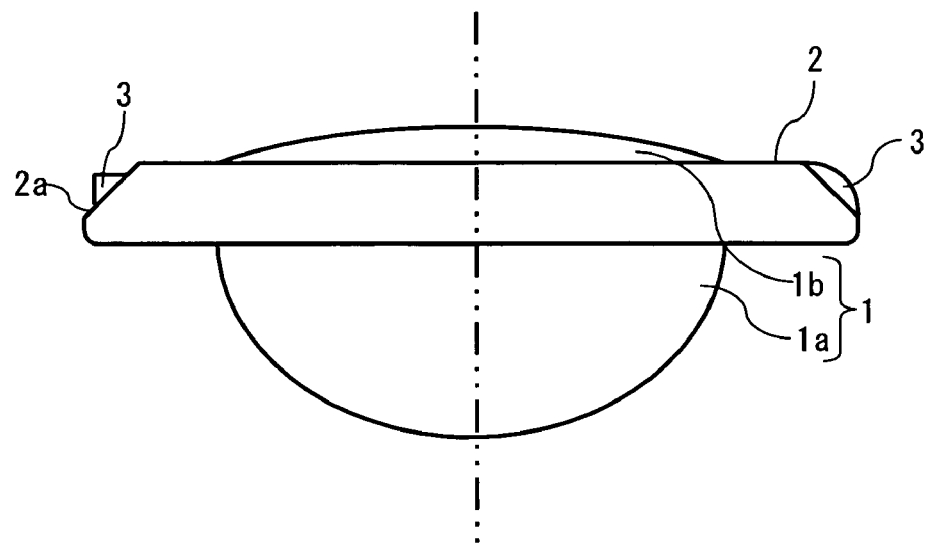
FIG. 12B is a side view of a glass lens according to the third embodiment of the present invention.
Figure 13:
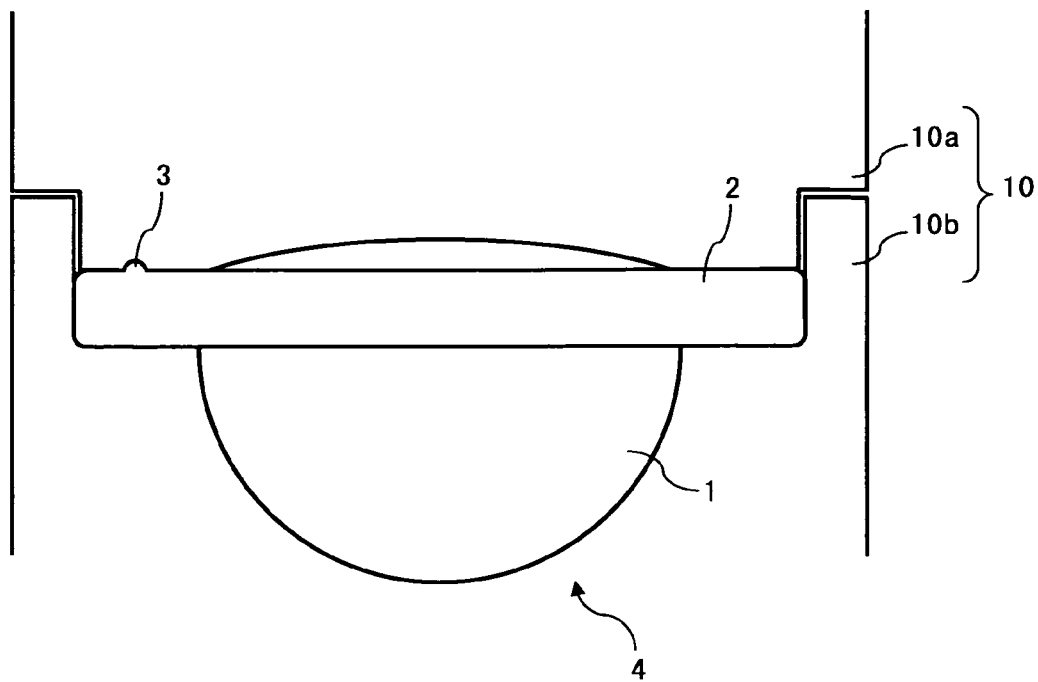
FIG. 13 is a side view showing a method of manufacturing a glass lens.
Figure 14:
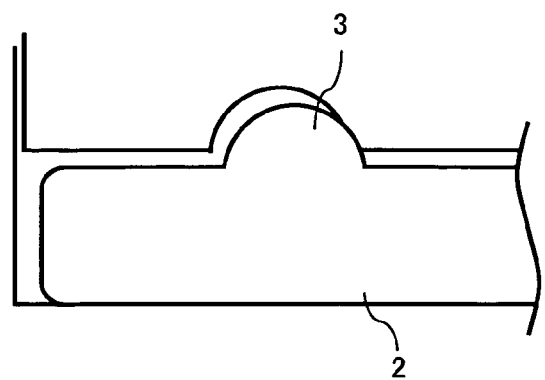
FIG. 14 is an enlarged side view of a marking portion of a glass lens.

The glass lens according to another embodiment is described hereinafter with reference to FIGS. 12A and 12B. FIG. 12A is a top view of the glass lens 4. FIG. 12B is a side view of the glass lens 4.

The glass lens 4 includes the optical functional portion 1, the flange portion 2 and the marking portion 3. The optical functional portion 1 includes the first optical functional portion 1a and the second optical functional portion 1b. The optical functional portion 1 is the same as that in the first embodiment and thus not described herein. The flange portion 2 is placed on the periphery of the optical functional portion 1 of the glass lens 4. The flange portion 2 is formed in zonal shape on the entire perimeter. Further, the flange portion 2 includes an inclined portion. The inclined portion becomes higher in the optical axis direction from the outer edge of the flange portion toward the optical axis.

In this example, the ends of the top surface of the flange portion 2 (the surface on the side of the second optical functional portion 1b) are tapered as shown in FIG. 12B. The tapered part of the flange portion 2 is referred to as a tapered portion 2a. Therefore, the flange portion 2 has the tapered portion 2a as an inclined portion.

The marking portion 3 is formed on the tapered portion 2a of the flange portion 2. The marking portion 3 has a projecting shape. The cross-section area of the protruding marking portion 3 in the plane parallel with the bottom surface of the marking portion 3 is smaller than the bottom area of the marking portion 3.

The plane of the marking portion 3 which is in contact with the tapered portion 2a is the bottom surface of the marking portion 3 in a projecting shape. As shown in FIGS. 12A and 12B, the marking portion 3 projects from the tapered portion 2a. Further, the marking portion 3 extends from the center of the optical functional portion 1 toward the outer edge of the flange portion 2 as shown in FIGS. 12A and 12B. Specifically, the marking portion 3 has a projecting shape that a semi-cylinder protrudes from the tapered portion 2a. The top end of the marking portion 3 does not protrude from the top of the flange portion 2. The diameter of the glass lens 4 (including the flange portion 2) is 3 to 6 mm, for example. The diameter of the optical functional portion 1 is 2 to 5 mm, for example.

In the above-described glass lens 4, like the first and second embodiments, the cross-sectional shape along a given first plane includes the cross-sectional shape along a given second plane that is farther from the optical axis than the first plane is in the Y axis direction. Thus, the shape or the position of the marking portion 3 is set so as to prevent the deformation of the marking portion 3 by contact with a molding tool due to shrinkage of material during cooling. This embodiment therefore has the same advantage as the first and second embodiments.

The shape of the marking portion 3 is not limited to a rectangular or semi-cylindrical shape, and it may be various shapes such as a polygonal shape as in the first and second embodiments. The glass lens 4 of this embodiment is also formed using a molding die having a shape corresponding to the shape of the glass lens 4 as in the first and second embodiments. This prevents the chipping of the marking portion 3.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A glass lens manufactured by hardening a glass material supplied to a molding tool by cooling, comprising:
    a pair of optical functional portions having a common optical axis;
    a flange portion that is provided on a periphery of the pair of optical functional portions and comprises a pair of surfaces opposed to each other; and
    a marking portion that comprises at least one of a depressed shape or a projecting shape, and is integrally formed on at least one of the pair of surfaces, the marking portion extending along a radial direction such that the marking portion is configured to comprise a longitudinal shape in which the longitudinal direction of the marking portion is equal to the radial direction, the radial direction crossing the optical axis orthogonally, wherein
    the marking portion comprises an end portion in which a height or depth of the marking portion parallel to the optical axis varies as the marking portion extends along the radial direction, and
    a variation of the height or depth of the marking portion is set to prevent chipping of the marking portion which is caused by contact between the marking portion and the molding tool due to shrinkage of the glass material during cooling.

2. The glass lens according to claim 1, wherein
    the marking portion is configured to be the projecting shape with one end coupled to and contacting one of the pair of optical functional portions and the height of the end portion of the marking portion decreases as the marking portion extends away from the optical axis.

3. The glass lens according to claim 1,
    wherein the marking portion is configured to be the depressed shape, the depressed shape is a groove shape, and the depth of the end portion of the marking portion decreases as the marking portion extends toward the optical axis.

4. The glass lens according to claim 1, wherein the marking portion is configured to be the depressed shape, and has a surface that becomes closer to the at least one of the pair of surfaces of the flange portion on which the marking portion is formed.

5. The glass lens according to claim 4, wherein the end portion of the marking portion becomes narrower as the marking portion extends towards the pair of optical functional portions when the marking portion is viewed along the optical axis.

6. A method for producing the glass lens of claim 1, comprising:
    supplying the glass material to the molding tool, the molding tool comprising a pair of molds, at least one of the pair of molds comprising a marking formation portion for forming the marking portion of the glass lens, the marking formation portion being configured to prevent the chipping of the marking portion;

arranging the pair of molds such that the glass material is interposed between the pair of molds;

heating the glass material that is supplied to the molding tool; and cooling the glass material that is interposed between the pair of molds.

7. A molding tool for molding a lens by hardening a glass material by cooling, comprising:

a first part for molding an optical functional portion having an optical axis; and a second part for molding a marking portion that comprises at least one of a depressed shape or a projecting shape, the second part extending along a radial direction such that the second part is configured to comprise a longitudinal shape in which the longitudinal direction of the second part is equal to the radial direction, the radial direction crossing the optical axis orthogonally, wherein a shape of the second part is set to prevent chipping of the marking portion which is caused by contact between the marking portion and the molding tool due to shrinkage of the glass material during cooling.

8. A glass lens manufactured by hardening a glass material supplied to a molding tool, comprising:

a pair of optical functional portions having a common optical axis;

a flange portion that is provided on a periphery of the pair of optical functional portions and comprises a pair of surfaces opposed to each other; and a marking portion that comprises at least one of a depressed or projecting shape, and is integrally formed on at least one of the pair of surfaces, the marking portion extending along a radial direction such that the marking portion is configured to comprise a longitudinal shape in which the longitudinal direction of the marking portion is equal to the radial direction, the radial direction crossing the optical axis orthogonally, wherein the marking portion comprises an end portion in which a cross sectional shape of the marking portion in a plane crossing the radial direction orthogonally varies as the marking portion extends along the radial direction, and a variation of the cross sectional shape of the marking portion is determined to prevent chipping of the marking portion which is caused by contact between the marking portion and the molding tool due to shrinkage of the glass material during cooling.

9. The glass lens according to claim 8, wherein the marking portion is configured to be the depressed shape, and has a surface that becomes closer to the at least one of the pair of surfaces of the flange portion on which the marking portion is formed.

10. The glass lens according to claim 9, wherein the end portion of the marking portion becomes narrower as the marking portion extends towards the pair of optical functional portions when the marking portion is viewed along the optical axis.

11. A method for producing the glass lens of claim 8, comprising:

supplying the glass material to the molding tool, the molding tool comprising a pair of molds, at least one of the pair of molds comprising a marking formation portion for forming the marking portion of the glass lens, the marking formation portion being configured to prevent the chipping of the marking portion;

arranging the pair of molds such that the glass material is interposed between the pair of molds;

heating the glass material that is supplied to the molding tool; and cooling the glass material that is interposed between the pair of molds.

12. A method for producing a glass lens that comprises a pair of optical functional portions having a common optical axis, a flange portion provided on a periphery of the pair of optical functional portions and having a pair of surfaces opposed to each other, and a marking portion comprising at least one of a depressed or a projecting shape, the marking portion extending along a radial direction such that the marking portion is configured to comprise a longitudinal shape in which the longitudinal direction of the marking portion is equal to the radial direction, the radial direction crossing the optical axis orthogonally, the method comprising:

supplying a glass material to a molding tool that comprises a pair of molds, at least one of the pair of molds comprising a marking formation portion for forming the marking portion of the glass lens, the marking formation portion being configured to prevent chipping of the marking portion which is caused by contact between the marking portion and the molding tool due to shrinkage of the glass material during cooling;

arranging the pair of molds such that the glass material is interposed between the pair of molds;

heating the glass material that is supplied to the molding tool; and cooling the glass material that is interposed between the pair of molds.

* * * * *